(12) United States Patent
Scheibelhut

(10) Patent No.: US 12,461,182 B2
(45) Date of Patent: Nov. 4, 2025

(54) APPARATUS AND METHOD FOR CALIBRATING A BATTERY EMULATOR

(71) Applicant: dSPACE GmbH, Paderborn (DE)

(72) Inventor: Peter Scheibelhut, Paderborn (DE)

(73) Assignee: dSPACE GMBH, Paderborn (DE)

( * ) Notice: Subject to any disclaimer, the term of this patent is extended or adjusted under 35 U.S.C. 154(b) by 377 days.

(21) Appl. No.: 18/082,058

(22) Filed: Dec. 15, 2022

(65) Prior Publication Data

US 2023/0194643 A1    Jun. 22, 2023

(30) Foreign Application Priority Data

Dec. 21, 2021 (DE) ...................... 10 2021 133 994.4
Dec. 21, 2021 (EP) ...................... 21216287

(51) Int. Cl.
*G01R 35/00* (2006.01)
*G01R 31/378* (2019.01)

(52) U.S. Cl.
CPC ......... *G01R 35/007* (2013.01); *G01R 31/378* (2019.01)

(58) Field of Classification Search
CPC ............................. G01R 35/007; G01R 31/378
See application file for complete search history.

(56) References Cited

U.S. PATENT DOCUMENTS

| | | | |
|---|---|---|---|
| 6,313,546 B1 * | 11/2001 | Nishimura | H02J 7/1423 |
| | | | 307/9.1 |
| 9,404,977 B2 | 8/2016 | Tran et al. | |
| 10,539,624 B2 | 1/2020 | Schipfer | |
| 10,551,804 B2 | 2/2020 | Hoenig et al. | |
| 11,467,206 B2 | 10/2022 | Goeldner et al. | |
| 2006/0132098 A1 * | 6/2006 | Lin | H01M 10/4257 |
| | | | 320/150 |
| 2011/0127831 A1 * | 6/2011 | Skarani | G06F 1/3212 |
| | | | 307/10.7 |
| 2013/0006599 A1 * | 1/2013 | Burkes | G06F 30/367 |
| | | | 703/13 |
| 2018/0017630 A1 * | 1/2018 | Schipfer | G01R 31/396 |
| 2018/0272883 A1 * | 9/2018 | Schmidt | H02J 7/00308 |
| 2020/0412249 A1 * | 12/2020 | König | H02M 3/156 |

FOREIGN PATENT DOCUMENTS

| | | | | |
|---|---|---|---|---|
| DE | 10 2015 206 778 A1 | 11/2015 | | |
| DE | 10 2014 226 190 A1 | 6/2016 | | |
| JP | 2012047715 | * 3/2012 | ............. | G01R 31/36 |
| WO | WO 02/097460 A2 | 12/2002 | | |
| WO | WO 2015/135922 A1 | 9/2015 | | |
| WO | WO 2019/079836 A1 | 5/2019 | | |

* cited by examiner

*Primary Examiner* — Lisa M Caputo
*Assistant Examiner* — Sharah Zaab
(74) *Attorney, Agent, or Firm* — Muncy, Geissler, Olds & Lowe, P.C.

(57) ABSTRACT

An apparatus or method for calibrating a battery emulator is proposed. The battery emulator emulates a plurality of cells connected in series, wherein each emulated cell has taps over which at least one emulated quantity is tapped, wherein the apparatus comprises a switching apparatus via which a calibration standard is switchably connectable with different taps.

12 Claims, 4 Drawing Sheets

APPARATUS AND METHOD FOR CALIBRATING A BATTERY EMULATOR

This nonprovisional application claims priority under 35 U.S.C. § 119(a) to German Patent Application No. 10 2021 133 994.4, which was filed in Germany on Dec. 21, 2021, and to European Patent Application 21216287, which was filed in Europe on Dec. 21, 2021 and which are both herein incorporated by reference.

BACKGROUND OF THE INVENTION

Field of the Invention

The present invention relates to an apparatus and method for calibrating a battery emulator which emulates a high-voltage battery with a plurality of cells connected in series.

SUMMARY OF THE INVENTION

It is an object of the present invention to provide an apparatus or method for calibrating a battery emulator that improves the process of calibration.

In an exemplary embodiment, it is therefore proposed to provide an apparatus or method for calibrating a battery emulator which emulates a high-voltage battery with a plurality of cells connected in series, wherein each emulated cell has taps over which at least one emulated quantity is tapped, wherein the apparatus comprises a switching apparatus via which a calibration standard is switchably connectable with different taps.

Thus, an apparatus or method for calibrating a battery emulator has been created, which can make do with only a single calibration standard. This simplifies the effort. In addition, a simple automation of such a calibration is possible. This can save installation space and enable a compact design.

The apparatus or method is suitable, in particular, for the testing of so-called battery management systems (BMS), especially for traction batteries, preferably high-voltage traction batteries, but its use is also possible for applications in power supply networks.

In BMS, an Electronic ECU (Electronic Control Unit) performs battery management tasks. In the present case, a high-voltage battery with a plurality of cells connected in series can be emulated by the apparatus or method according to the subject-matter of the independent claims. The ECU is then tested by this emulated high-voltage battery as Hardware in-the-Loop (HiL), e.g., tested for its functionality, but other tests with the emulated high-voltage battery are also possible with such an HIL arrangement.

Thus, there is an electrical replica of a real high-voltage battery through emulation.

The ECU itself has a computing unit, memory, interfaces and possibly other components that are required for the processing of input signals into the ECU and the generation of control signals. The interfaces are used to record the input signals or output the control signals. It is possible that the ECU is implemented on a so-called central computer, which performs various control functions, i.e., not only the control of the high-voltage battery. A central computer can be understood as a computer that is characterized above all by the use of graphics processors, which are present, for example, in redundancy.

Due to the subject-matter of the application, the use of an external calibration apparatus can be omitted because the switching apparatus and the calibration standard can be integrated into the battery emulator. The simulated cells do not have to be implemented by high-precision and therefore very expensive electrical components, because a correction of the component tolerances is possible through calibration and subsequent adjustment.

In the present case, calibration can be understood as a comparison of measured values of the emulated high-voltage battery or its cells to the values of the calibration standard. This is because the calibration standard provides values with a known or specified accuracy or precision. This comparison may result in no action being required if the comparison does not result in a deviation above a threshold value, for example. Alternatively, the comparison can lead to a deviation that is significant, e.g., above a specified threshold value. As a consequence, either only a calibration, i.e., a recording of this significant deviation, can take place or the adjustment, i.e., an adjustment of parameters, can take place, which, for example, should lead to a lower deviation in a subsequent comparison.

In the present case, a battery emulator simulates the behavior of a high-voltage battery defined according to the subject matter of this application. For this purpose, the battery emulator has two connections per cell, each of which embodies the positive and negative poles of the respective cell. By using electrical circuits and functions running on one or more processors for the battery emulator, one or more models of the high-voltage battery and its respective cells are realized. Such a model can be adjustable via at least one parameter. The battery emulator can therefore simulate, for example, an output voltage of the cells or the high-voltage battery at fast and high load jumps. This makes it possible to test a wide variety of components that are directly or indirectly connected to the high-voltage battery, but of course it can also be tested how the emulation of the high-voltage battery itself is to be parameterized.

A high-voltage battery supplies DC voltage, for example, of 60V-1.5 kV depending on requirements. Traction batteries for vehicles, for example, have several hundred volts output voltage, but due to the need to be able to charge the high-voltage battery faster, a trend towards higher voltages, e.g., 800V, can be seen. For a high-voltage battery, the cells are connected in series according to the application, so that, for example, the individual cells only have an output voltage of a few volts, which then add up to the high voltage. For example, lithium-ion batteries or other metal hybrid batteries are used.

The cells each have taps over which at least an emulated quantity such as an electrical voltage is tapped, but other quantities such as an electric current are also tapped.

The switching apparatus is further defined by the dependent claims. In the present case, however, the switching apparatus can preferably be formed as hardware, i.e., the switching apparatus has switches which are controllable in each case. In the present case, it is the function of the switching apparatus to connect the taps of the individual cells in each case with the calibration standard so they can be switched. It is possible that only one cell is connected to the calibration standard via the switching apparatus via its taps or more than one. The switching apparatus fulfills the function of a multiplexer whose switching elements have a high, durable dielectric strength, reliable switching of low voltages, high insulation resistance and low fault voltage. Preferably, the switching elements also have a sufficient current-carrying capacity, if a calibration of the current measurement is desired. An emulated cell may be able to measure its output current. For this purpose, the calibration of the current measurement can be used advantageously.

The function of the calibration standard is the comparison of the emulated quantity at the respective taps with the previously known values with predetermined accuracy.

Switchably connectable expresses that the calibration standard is connected to the taps of the cells and that then the calibration standard can also be connected to other cells. Thus, on the one hand, the battery emulator is connected to the switching apparatus via the taps of the respective cells and, on the other hand, the calibration standard.

In the method for calibrating the battery emulator, which emulates a high-voltage battery with a plurality of cells connected in series, wherein each emulated cell has taps over which at least one emulated quantity is tapped, a calibration standard is connected successively to different taps via a switching apparatus.

It is proposed that the calibration standard is connectable to the taps of one emulated cell at a time and this connection is switchable with other emulated cells. This can then be used, for example, to calibrate cell by cell.

Furthermore, it is proposed that the switching apparatus comprises switching elements and the connection between the taps of each emulated cell and the calibration standard comprises one or more pairs of switching elements in series. This makes it possible to interconnect signals from the taps of the respective cells in the sense of a multiplexer or to switch signals of the respective cells to the calibration standard. These switching elements can be controlled according to a fixed sequence or adaptively as a function of the signals themselves or as a function of user input or other control signals.

In addition, it is proposed that the switching elements are formed as electromechanical switching elements. The emulated cells should be regularly tested with regard to their precise voltage specification and remeasurement of output current and voltage. Therefore, a corresponding dielectric strength and sufficient current-carrying capacity for the switching elements is necessary. This is achieved, for example, by the electromechanical switching elements.

It is further proposed that the emulated quantity is a voltage and the calibration standard has a voltage meter which is connected to a pair of high-voltage bus rails of the switching apparatus and is configured to measure a voltage applied between the high-voltage bus rails.

Furthermore, it is proposed that the taps of each emulated cell are connectable via one or more pairs of the switching elements of the switching apparatus with the high-voltage bus rails. Via the levels of the pairs of switching elements, corresponding interconnections of taps can take place. Furthermore, switching elements can be used in more than one level, which may have a low switching dielectric strength in the first level or levels. Via the high-voltage bus rails, it is then possible for the calibration apparatus to measure an output voltage of the emulated battery composed in this way. It is therefore up to the switching apparatus which voltages are connected from which cells to these high-voltage bus rails.

Furthermore, it is proposed that the switching apparatus comprises a plurality of pairs of low-voltage bus rails, each of which can be connected in pairs via respective pairs of high-voltage switching elements to the high-voltage bus rails. With this intermediate step of the low-voltage bus rails, fewer high-voltage switching elements have to be used than if the taps of the cells are switched directly to the high-voltage bus rails via high-voltage switching elements. As a result, less complex low-voltage switches, also known as low-voltage switching elements, can be used instead of high-voltage switches, also known as high-voltage switching elements. This saves space and costs. The connecting cables can also be designed simpler in the low-voltage range due to the lower voltage.

It may be provided that one or more emulated cells connected in series can be connected in each case to a pair of low-voltage bus rails via a pair of low-voltage switching elements.

Furthermore, the battery emulator can emulate a plurality of cell groups connected in line and/or in series, wherein each cell group emulates a plurality of cells connected in series, wherein the emulated cells of the respective emulated cell group are connectable via an associated pair of low-voltage switching elements to the low-voltage bus rails.

In an example, the apparatus has the battery emulator and the calibration standard in addition to the switching apparatus. Preferably, the switching apparatus, the battery emulator and the calibration standard are arranged in one housing. This offers the advantage that the taps can also be arranged within the housing and do not have to be additionally routed to the outside for the purpose of calibration. An advantage of this embodiment is that the switches and in particular the low voltage switching elements can be supplied with energy and controlled by the emulated cells. The galvanically isolated power supply and control required for the emulated cells can thus serve in this embodiment simultaneously for power supply and control for the switches. The advantage here is that the switches, in particular the low voltage switching elements, are then galvanically isolated from each other with high insulation strength due to the structure of the emulated cells. If the switches are otherwise supplied with energy and controlled, it may be necessary to provide additional, expensive galvanic isolation between the switches.

It can be provided that the apparatus has a connection for an ECU which is designed as a multi-pole plug device and via which the at least one emulated quantity is provided. The plug device may be provided, for example, as a multi-pin socket of a socket-plug combination. The emulated quantity is made available to the ECU via the connector. In this embodiment, the taps for connecting the calibration standard are provided via the switching apparatus as well as the connection for exchanging data and emulated quantities with the ECU.

In addition, it is provided that the calibration standard is connected via the switching apparatus by switching operations successively to one of the emulated cells.

It is also proposed that at the taps of the emulated cells a voltage is tapped as an emulated quantity and the calibration comprises a voltage measurement at the taps connected to the calibration standard.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
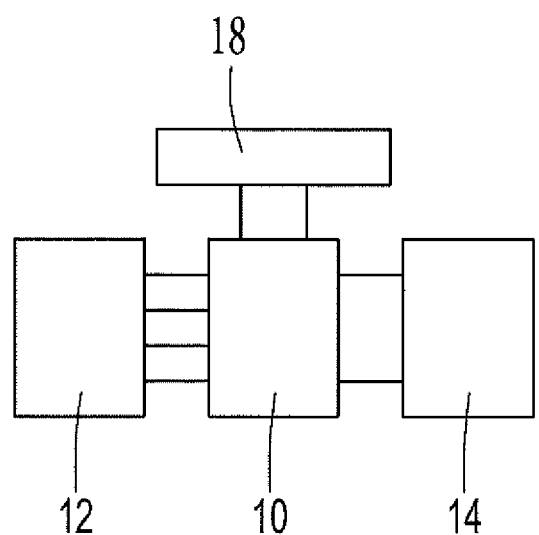
FIG. 1 is a block diagram of the apparatus in conjunction with the calibration standard and the ECU, which is tested.

In an overview, FIG. 1 shows the battery emulator 12, which is connected via the switching apparatus 10 to the calibration standard 14. Via the switching apparatus 10, the ECU 18 can also be connected as part of a so-called battery management systems BMS, for example, for controlling the battery. It is alternatively possible that the ECU 18 can also be connected directly to the cells or to other connections of the switching apparatus 10.

The battery emulator 12 provides as emulation various output voltage curves and/or output current curves, which a real battery can output. Thus, the functionality of the ECU 18 is tested and, if necessary, parameters of the software functions executed on it can be set.

Figure 2:
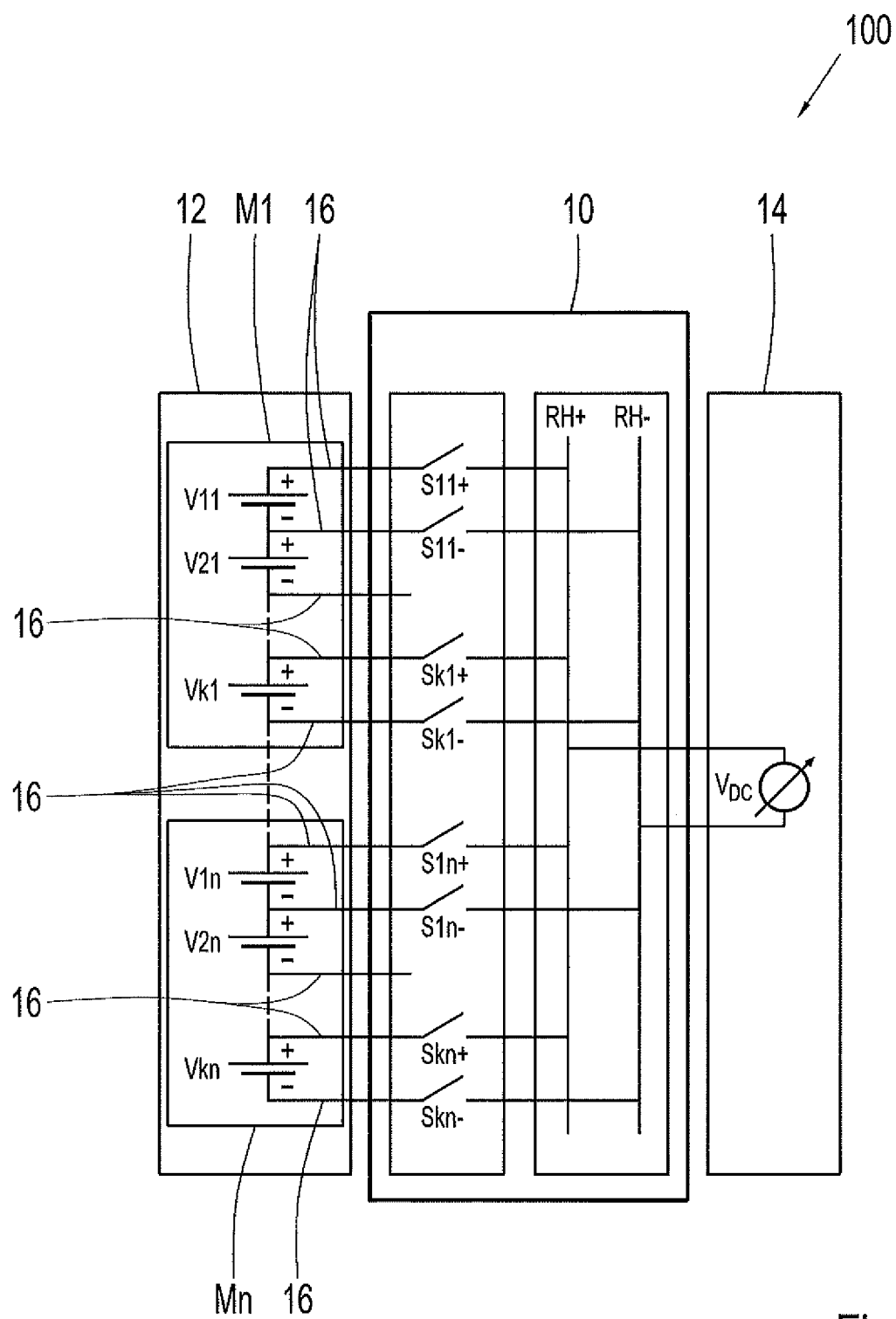
FIG. 2 is a first example of the switching apparatus between the battery emulator and the calibration standard.

FIG. 2 shows the apparatus according to the application in a first embodiment. In this case, the battery emulator 12 is connected via the switching apparatus 10 to the calibration standard 14. Respective taps 16 of the respective emulated cells V11 ... Vkn, which are available in pairs for measuring the DC voltage, are connected to respective switching elements or switches, e.g., S11+ and S11−. These switches S11+, S11− to Skn+, Skn− are designed as high-voltage switching elements. In particular, they are also designed as electromechanical switching elements. The connection between the respective taps 16 and the respective switching elements S11+, S11− to Skn+, Skn− can be formed permanently as required, for example by a material-locking connection, or detachably, for example by plugged cables.

The emulated cells V11-Vkn can be combined into emulated cell groups M1-Mn. Thus, it is possible to emulate such groups M1-Mn separately and to confront the ECU 18 with, for example, different behavior of such groups M1-Mn.

The switching elements S11-Skn are connected in the switching apparatus 10 to high-voltage bus rails RH+ and RH−, wherein attention must be paid to the correct polarity. The voltages at the individual switching elements S11 to Skn add up on the high-voltage bus rails RH+ and RH−, so that several hundred volts can then be applied to these high-voltage bus rails RH+ and RH−. The high-voltage bus rails RH+ and RH− can represent a high-voltage network in an electrically powered vehicle, to which inverters and rectifiers can then be connected for different purposes. However, the ECU 18 is also connected to these high-voltage bus rails RH+ and RH− to control the electrical power supply of the connected components.

The calibration standard 14 is connected to the high-voltage bus rails RH+ and RH−, which in the present case has a voltage meter VDC.

Figure 3:
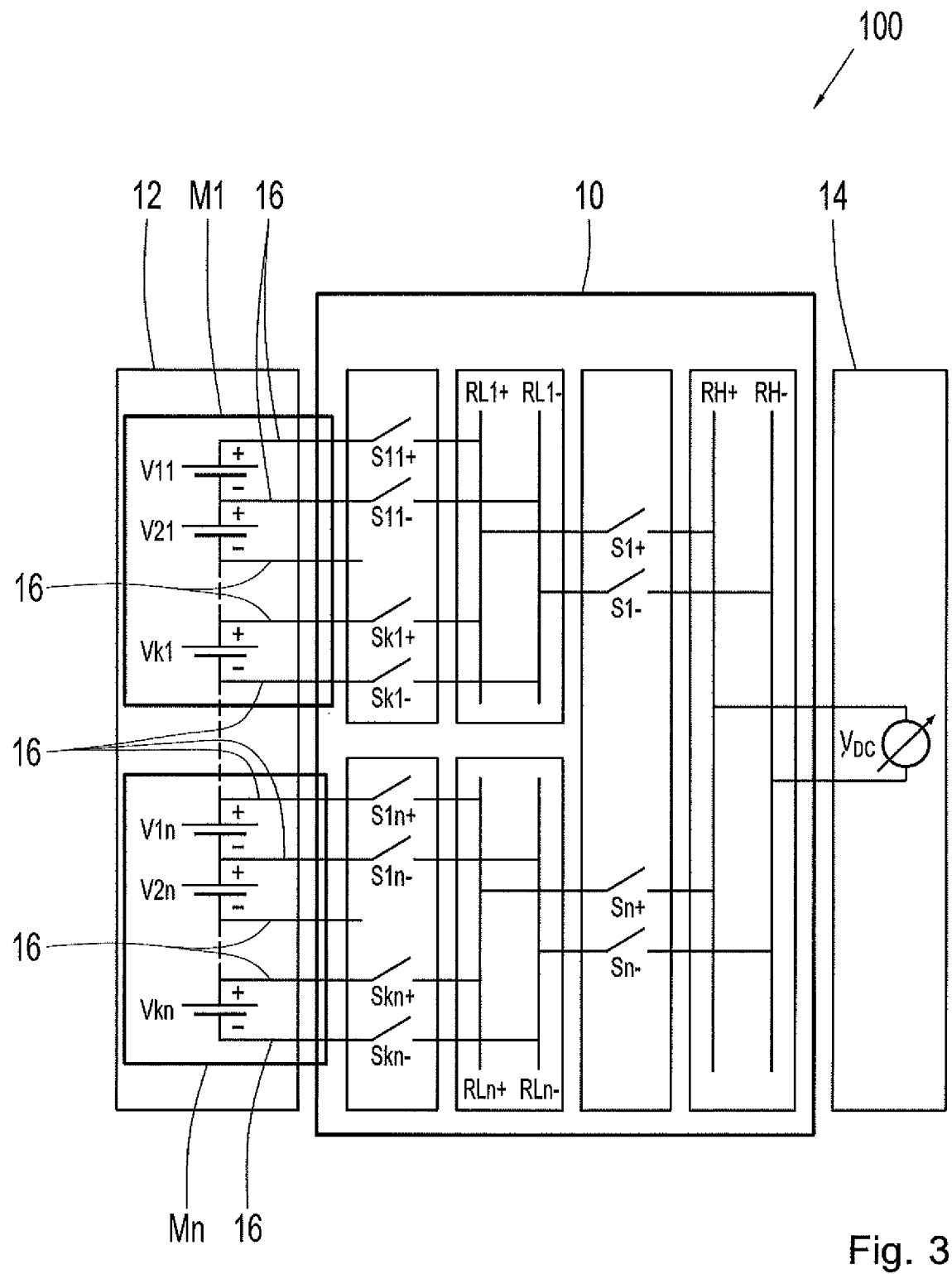
FIG. 3 is a second example of the switching apparatus between the battery emulator and the calibration standard.

FIG. 3 shows a second embodiment of the switching apparatus 10, which is arranged between the battery emulator 12 and the calibration standard 14. Again, switching elements S11-Skn are connected to the respective taps of the cells V11 to Vkn. Now these switches S11-Skn connect each group M1-Mn with a respective pair of low-voltage bus rails RL1-RLn. One rail, for example, RL1+ is provided for the positive potential and the other rail RL1− of the respective pair for the negative potential of the output voltage of the respective cell group M1-Mn. On the other side, a pair of switching elements S1+, S1− to Sn+, Sn− is provided on each of these low-voltage bus rails, which connect the low-voltage bus rails RL1-RLn with the high-voltage bus rails RH+ and RH−. These switching elements S1-Sn can also be designed as electromechanical switches.

Figure 4:
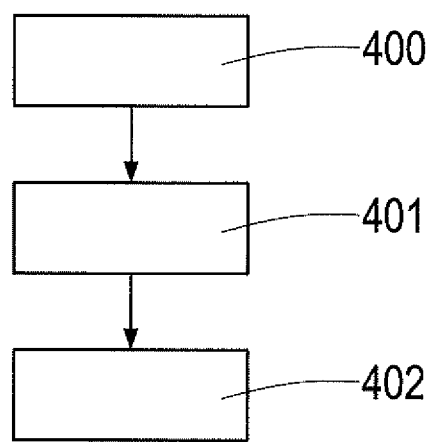
FIG. 4 is a flow diagram of the method for calibrating the battery emulator.

FIG. 4 shows a flow chart of the method for calibrating a battery emulator according to the application. In this case, in method step 400, the battery emulator 12 is started in order to output output voltages and currents of a real battery according to plan. In method step 401, the battery emulator 12 is connected via the switching apparatus 10 to the calibration standard 14. For this purpose, the switching elements in the switching apparatus 10 are controlled accordingly. With the calibration standard 14, the individual cells with nominal values are then compared by comparison. If necessary, an intervention is carried out to adjust the emulated cells accordingly. These steps are then performed by a computer. In method step 402, the testing of the ECU 18 can then be carried out. This computer may be part of the apparatus 100, for example as an element of the battery emulator 12 or the switching apparatus 10. In particular, the computer may be configured to perform a calibration of the battery emulator 12 automatically, for example, controlled by commands of an algorithm stored on the computer. Typically, it can also be one or, if necessary, several computers communicating with each other in the BMS HIL system, which equally take over the control of the battery emulator 12, the switching apparatus 10 and the calibration standard 14.

Figure 5:
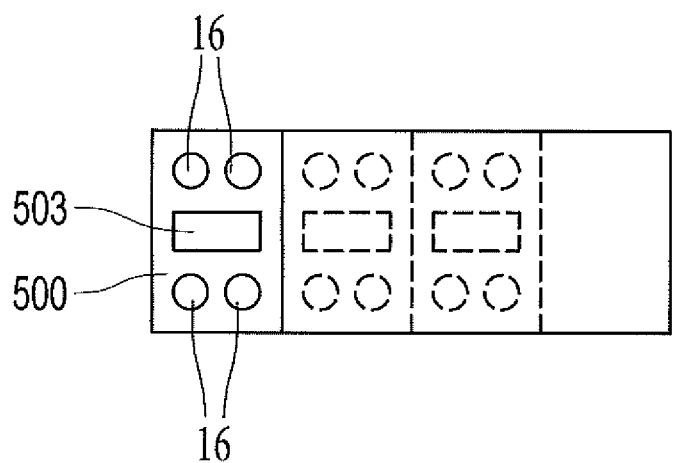
FIG. 5 is a connection panel of a battery emulator.

FIG. 5 shows a connection panel AF of a battery emulator 12. In this case, two emulated cells may be provided per slide-in 500, to each of which a pair of taps 16 is connected. Via the taps 16, the switching apparatus 10 can be connected, and to the switching apparatus 10 a calibration standard 14. A central connection 503 for the connection of the ECU 18 is also provided. The emulated size of the cells is provided over both the taps 16 as well as the connection 503. In addition to the slide-in 500, identically designed slide-ins usually follow, which also emulate two cells each.

In a further embodiment, the switching apparatus 10 and the calibration standard 14 are integrated into the housing of the battery emulator 12. This means that the battery emulator 12, the switching apparatus 10 and the calibration standard 14 are arranged in the same housing. The taps 16 are arranged inside the housing and do not have to be additionally routed to the outside for the purpose of calibration. The calibration and adjustment of the battery emulator 12 can then be performed inside the housing without having to connect to the calibration standard 14 outside the housing. In the connection panel AF of FIG. 5, the taps 16 can then be omitted.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An apparatus for calibrating a battery emulator, which emulates a high-voltage battery with a plurality of cells connected in series, wherein each emulated cell has taps over which at least one emulated quantity is tapped, the apparatus comprising a switching apparatus via which a calibration standard is switchably connectable with different taps, wherein the emulated quantity is a voltage and the calibration standard has a voltage meter which is connected to a pair of high-voltage bus rails of the switching apparatus and is set up to measure a voltage applied between the high-voltage bus rails, wherein the taps of an emulated cell are connectable via a pair of switching elements or a plurality of pairs of switching elements of the switching apparatus is connected to the high-voltage bus rails, and wherein the switching apparatus comprises a plurality of pairs of low-voltage bus rails, each of which is connectable via a pair of high-voltage switching elements to the high-voltage bus rails.

2. The apparatus according to claim 1, wherein the calibration standard is connectable in each case with the taps of an emulated cell and this connection to other emulated cells is switchable.

3. The apparatus according to claim 1, wherein the switching apparatus has switching elements and the connection between the taps of an emulated cell and the calibration standard has one or more pairs of switching elements in series.

4. The apparatus according to claim 3, wherein the switching elements are formed as electromechanical switching elements.

5. The apparatus according to claim 1, wherein a plurality of emulated cells connected in series is connectable via a pair of low-voltage switching elements to a pair of low-voltage bus rails.

6. The apparatus according to claim 5, wherein the battery emulator emulates a plurality of cell groups connected in line and/or in series, each of which emulates a plurality of cells connected in series, wherein the emulated cells of an emulated cell group are adapted to be connected to the low-voltage bus rails via a pair of low-voltage switching elements.

7. The apparatus according to claim 1, further comprising a battery emulator and a calibration standard.

8. The apparatus according to claim 7, wherein the switching apparatus, the battery emulator and the calibration standard are arranged in one housing.

9. The apparatus according to claim 1, wherein the apparatus comprises a connection for an ECU, which is designed as a multi-pole plug device and over which at least one emulated quantity is provided.

10. A method for calibrating a battery emulator, the method comprising:

emulating, via the battery emulator, a high-voltage battery with a plurality of cells connected in series, wherein each emulated cell has taps, over which at least one emulated quantity is tapped; and successively connecting a calibration standard to different taps via a switching apparatus, wherein the emulated quantity is a voltage and the calibration standard has a voltage meter which is connected to a pair of high-voltage bus rails of the switching apparatus and is set up to measure a voltage applied between the high-voltage bus rails, wherein the taps of an emulated cell are connectable via a pair of switching elements or a plurality of pairs of switching elements of the switching apparatus is connected to the high-voltage bus rails, and wherein the switching apparatus comprises a plurality of pairs of low-voltage bus rails, each of which is connectable via a pair of high-voltage switching elements to the high-voltage bus rails.

11. The method according to claim 10, wherein the calibration standard is successively connected via the switching apparatus by switching operations to one of the emulated cells.

12. The method according to claim 10, wherein at the taps of the emulated cells a voltage is tapped as an emulated quantity and the calibration comprises a voltage measurement at the taps connected to the calibration standard.

* * * * *